(12) United States Patent
Macaskill

(10) Patent No.: US 9,525,907 B2
(45) Date of Patent: Dec. 20, 2016

(54) HARDWARE DEVICE FOR MULTIMEDIA TRANSMISSION

(71) Applicant: SMUGMUG, INC., Mountain View, CA (US)

(72) Inventor: Don Macaskill, Los Altos, CA (US)

(73) Assignee: SmugMug, Inc., Mountain View, CA (US)

( * ) Notice: Subject to any disclaimer, the term of this patent is extended or adjusted under 35 U.S.C. 154(b) by 0 days.

(21) Appl. No.: 14/423,204

(22) PCT Filed: Aug. 22, 2013

(86) PCT No.: PCT/US2013/056136
§ 371 (c)(1),
(2) Date: Feb. 23, 2015

(87) PCT Pub. No.: WO2014/031827
PCT Pub. Date: Feb. 27, 2014

(65) Prior Publication Data
US 2015/0249860 A1    Sep. 3, 2015

Related U.S. Application Data

(60) Provisional application No. 61/692,553, filed on Aug. 23, 2012.

(51) Int. Cl.
*H04N 7/173* (2011.01)
*H04N 7/16* (2011.01)
*H04N 7/18* (2006.01)
*H04N 21/4363* (2011.01)
*H04L 29/06* (2006.01)
(Continued)

(52) U.S. Cl.
CPC .... *H04N 21/43635* (2013.01); *H04L 65/4084* (2013.01); *H04N 21/2393* (2013.01); *H04N 21/4126* (2013.01); *H04N 21/42684* (2013.01); *H04N 21/437* (2013.01); *H04N 21/43632* (2013.01); *H04N 21/43637* (2013.01); *H04N 21/4432* (2013.01)

(58) Field of Classification Search
USPC .................... 725/68, 85, 100, 131, 139, 151
See application file for complete search history.

(56) References Cited

U.S. PATENT DOCUMENTS

2002/0194309 A1    12/2002  Carter et al.
2008/0022298 A1*   1/2008   Cavicchia ............. H04N 7/163
                                                          725/25
(Continued)

OTHER PUBLICATIONS

International Search Report and Written Opinion, PCT/US2013/056136, Nov. 14, 2013.

*Primary Examiner* — Nasser Goodarzi
*Assistant Examiner* — Fred Peng
(74) *Attorney, Agent, or Firm* — Patterson & Sheridan, LLP

(57) ABSTRACT

Devices and methods for viewing visual content and accompanying methods are provided. Devices include a digital video connector, a power supply and a computing unit which can have software components which are preprogrammed for connecting with a remote server without user interaction to provide visual content. Methods include connecting to a network, connecting to the remote server, receiving visual content from the remote server and displaying that content on a display. The content can be manipulated locally or from a remote site and can be updated continually.

17 Claims, 3 Drawing Sheets

(51) Int. Cl.
   *H04N 21/41*     (2011.01)
   *H04N 21/426*    (2011.01)
   *H04N 21/443*    (2011.01)
   *H04N 21/239*    (2011.01)
   *H04N 21/437*    (2011.01)

(56) References Cited

U.S. PATENT DOCUMENTS

| | | | | |
|---|---|---|---|---|
| 2008/0168129 | A1* | 7/2008 | Robbin | H04L 65/60 |
| | | | | 709/203 |
| 2008/0220761 | A1* | 9/2008 | Jang | H04M 1/7253 |
| | | | | 455/420 |
| 2009/0248914 | A1* | 10/2009 | Choi | H04N 5/765 |
| | | | | 710/33 |
| 2010/0093394 | A1* | 4/2010 | Hidaka | H04B 3/548 |
| | | | | 455/557 |
| 2011/0154200 | A1 | 6/2011 | Davis et al. | |
| 2013/0141331 | A1* | 6/2013 | Shiu | G09G 5/003 |
| | | | | 345/158 |
| 2013/0157729 | A1* | 6/2013 | Tabe | H04W 52/0245 |
| | | | | 455/573 |

\* cited by examiner

HARDWARE DEVICE FOR MULTIMEDIA TRANSMISSION

BACKGROUND OF THE INVENTION

Field of the Invention

Embodiments of the present invention generally relate to an apparatus for multimedia transmission.

Description of the Related Art

Today many households have High Definition Televisions (HDTV), which allow for high resolution images which either match or surpass the resolution of the screens for some computer systems. As HDTVs require better quality, and therefore larger video files, analog transmission systems fail to meet current needs. Thus, new digital connections, such as High Definition Multimedia Interface (HDMI), were created to accommodate the need for increased transmission speed and quality. Higher quality connections, such as HDMI, and HDTVs allow for more and better content, streaming media and more viewer interaction with their media.

Various multimedia devices can be connected to HDTVs, such as computers, which can increase user interaction and control over the viewing content. However, connecting a traditional computer requires a certain level of expertise that restricts the number of people who can install and use such a system. Thus, a person without the technical expertise might not be able to view digital pictures or other computer based multimedia on their HDTV without excess work, expensive equipment or hiring a third party technician. Further, using a traditional computer on a HDTV generally requires bulky peripherals, such as a keyboard or a mouse, which are difficult to use without a flat surface.

TV manufacturers have attempted to accommodate for the desire to view digital pictures on an HDTV by providing a universal serial bus (USB) port to allow for digital pictures to be played on the TV from a USB device, such as a flash drive or an external hard drive. A USB device would need to be preloaded with pictures, which could be viewed using specific settings from the manufacturer.

However, the use of the USB design is also flawed. First, the USB device is limited in the number of pictures that are available, as only the pictures which were transferred to the USB device are available. Second, updating with new pictures to a USB device for viewing on a properly equipped TV is a multistep and time consuming process. Further, manipulation of the pictures on a USB device is limited, as HDTVs are only designed to view the pictures.

Thus, there is a need for a device which provides an easy-to-use interface and can be constantly updated. As well, there is a need for a device which can be remotely controlled, programmed and manipulated to accommodate for the need of lower-skill users.

SUMMARY OF THE INVENTION

Embodiments of the present invention generally relate to an apparatus and method for remotely configuring and controlling visual content, which can be displayed on a television. In one embodiment, a device for viewing visual content can include a digital video connector, a computing unit and a power supply port. The computing unit can include a processor, a memory storage unit, one or more wireless devices, wherein at least one of the wireless devices connects to a network, and a computer readable storage medium. The computer readable storage medium can store instructions. The instructions can then be executed by the processor. The executed instructions can connect with a remote server over a network, wherein the instructions can provide one or more network identifiers to the remote server. The executed instructions can further provide one or more queries to the remote server to receive visual content which can include providing one or more visual content parameters to the remote server. The executed instructions can also provide an interface for connecting with a user device.

In another embodiment, a method for providing visual content to a display can include configuring a data transmission device with one or more network identifiers, wherein the data transmission device can have one or more device identifiers. The method can further including connecting the data transmission device with a remote server using a network, the one or more device identifiers and the one or more network identifiers. The method can further include configuring the data transmission device, which can be performed using either the remote server, one or more user devices or both. The method can further include providing one or more visual content parameters to the remote server, such as likes and dislikes of the user. The method can further include uploading visual content from the remote server to the data transmission device. The visual content can then be displayed on a display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
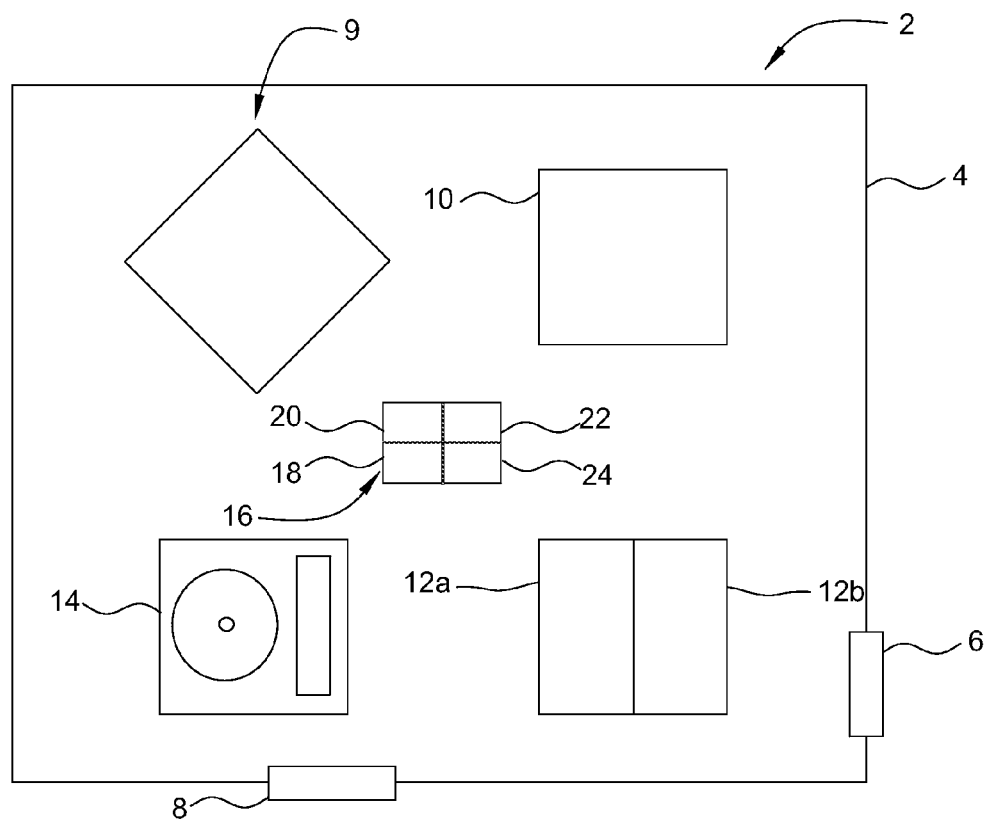
FIG. 1 illustrates the data transmission device according to one or more embodiments.

Embodiments of the present invention generally relate to an apparatus and method for remotely configuring and controlling visual content, which can be displayed on a television. The visual content can be controlled at a remote source and uploaded to a data transmission device. The data transmission device does not require interaction from the end user. The remote source can be controlled by either the end user or a third party.

In one embodiment, a device for viewing visual content can include a digital video connector, a computing unit and a power supply port. The computing unit can include a processor, a memory storage unit, one or more wireless devices, wherein at least one of the wireless devices connects to a network, and a computer readable storage medium. The computer readable storage medium can store instructions. The instructions can then be executed by the processor. The executed instructions can connect with a remote server over a network, wherein the instructions can provide one or more network identifiers to the remote server. The executed instructions can further provide one or more queries to the remote server to receive visual content which can include providing one or more visual content parameters to the remote server. The executed instructions can also provide an interface for connecting with a user device.

Further embodiments can include the device including one or more connectivity programs for creating a secondary network. The device can further have a display integrally connected with the device. The display can be a touchscreen display. The user device can be a touchscreen device. The device can further include reproducing the visual content on the user device. The digital video connector can be a HDMI port. In one or more embodiments, at least one of the one or more wireless devices can be a Bluetooth connection. In a further embodiment, the power supply port can be a USB port.

In another embodiment, a method for providing visual content to a display can include configuring a data transmission device with one or more network identifiers, wherein the data transmission device can have one or more device identifiers. The method can further including connecting the data transmission device with a remote server using a network, the one or more device identifiers and the one or more network identifiers. The method can further include configuring the data transmission device, which can be performed using the remote server, one or more user devices or both. The method can further include providing one or more visual content parameters to the remote server, such as likes and dislikes of the user. The likes and dislikes of the user can include any specific or general preferences of the user, such as types of content, specific individuals, previously viewed content, or combinations thereof. The method can further include uploading visual content from the remote server to the data transmission device. The visual content can then be displayed on a display.

In further embodiments, the data transmission device can be preconfigured with one or more network identifiers prior to receipt by an end user. The user device can be a touchscreen device. The network identifier can be a unique identifier. The data transmission device can connect with the display using an HDMI port. Visual content can be uploaded from the remote server on a continuous basis. The visual content can be reproduced and manipulated on the user device. The data transmission device can be integrated with the display. Visual content can be stored on the data transmission device. In one or more embodiments, connecting with the network can further include connecting to a user device which has a network connection and connecting with the network from the user device. The embodiments are more fully explained with reference to the figures below.

FIG. 1 illustrates a data transmission device 2 according to one or more embodiments. The data transmission device 2 uses a small form factor which allows for easy portability, such as a data transmission device which is no larger than a standard USB flash drive. A size for such a data transmission device may be about 2 inches long by ½ an inch wide by about ½ an inch thick. The device 2 can include a case 4 which supports and protects the device 2. The case 4 can be composed of standard materials for computing devices such as aluminum or plastic.

The case 4 can support external interface components like a digital video connector 6, such as an HDMI port, and a power supply port 8, such as a USB port. The digital video connector 6 and the power supply port 8 can be either male or female. In a female embodiment, the digital video connector 6 and the power supply port 8 can be connected to an external digital video connector cable or power supply port cable (not shown).

Inside the case 4, can be one or more internal components for processing and storing the data in the data transmission device 2. The data transmission device 2 can have a processor 9, which can be a low power consumption microprocessor, such as an ARM processor commercially available from ARM Holding PLC. The device can also have a graphics processing unit (GPU) 10. Though the GPU 10 is depicted as a separate unit, it may be integrated with other internal components, such as the processor 9. The GPU 10 can be used to process and render pictures and other visual media files on the display, shown in FIG. 2.

The data transmission device 2 can also have one or more wireless devices, depicted here as wireless devices 12a and 12b. The wireless devices 12 can be used to connect to either specific devices or to a network. The wireless devices 12 may also serve separate purposes, such as wireless device 12a can be Bluetooth connectivity device and wireless device 12b can be a connection for a Wi-Fi network.

The data transmission device 2 can also have a memory storage unit 14. The memory storage unit 14 can be a solid state memory device, such as a NAND-based flash memory device. The memory storage unit 14 can be either integrated into the data transmission device 2 or it can be a separately installable component, such as a Secure Digital (SD) card.

The data transmission device 2 can have installed software, which can either be installed in the memory storage unit 14 or on an optional internal memory 16. The installed software, such as one or more of each of the following: a networking program 18, a device program 20, an interface program 22 and an optional connectivity program 24. Though the installed software is depicted as being installed on the optional internal memory, this is but one embodiment and can be installed in other memory components.

Figure 2:
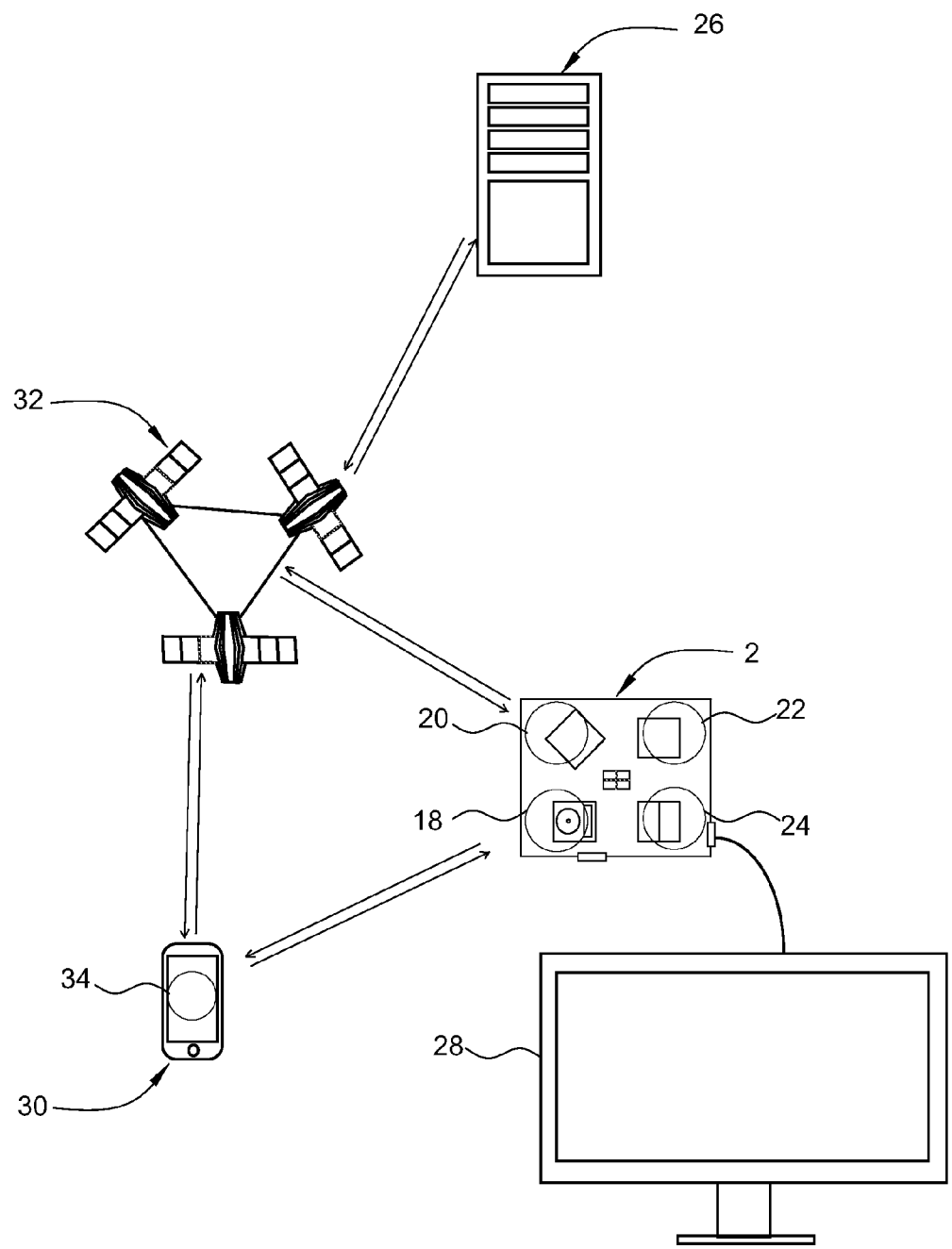
FIG. 2 depicts the data transmission device in operation according to one or more embodiments.

FIG. 2 depicts the data transmission device 2 in operation according to one or more embodiments. The networking program 18 can control connectivity to a remote server 26 through an established network connection. Though embodiments described here show only one remote server 26, the data transmission device 2 can connect with one or more remote servers 26. For the sake of clarity and brevity, the embodiments described below only refer to one of the one or more remote servers 26.

The networking program 18 can have functions including connecting to a wireless or wired network 32, connecting to a remote server 26 using the network 32, and allowing interface between the remote server 26 and the data transmission device 2. The networking program 18 can further automatically send to and receive instructions from the remote server 26 based on preprogrammed parameters when the data transmission device 2 is connected to the network 32.

The networking program 18 can include preprogrammed instructions, a device identifier and a network identifier to allow for connection with the remote server 26. The network identifier can be credentials for logging onto a network, such as a user name and a password for an account, or it can be information for connecting to openly accessible visual media, such as an online art display from a specific artist. The device identifier can be a specific code or sequence that can be recognized by the remote server 26. The device identifier can be used to provide information to the remote server 26 about the end user. Further, it can be used to prevent unauthorized access to the remote server 26. Using a network identifier and a device identifier, networking program 18 can establish a secure connection with the remote server 26 allowing the server to follow where changes are being made from, who is making the changes, and other user specific information.

The device program 20 can display the uploaded content from the remote server 26 on a display 28. The display 28 can be any size or shape display which can display visual content, with or without adaptation, such as a HDTV, a monitor for a computer, a small LCD screen or any other suitable display with a corresponding or adaptable digital video connector. The connection to the display can be internal, such as a data transmission device integrated into a display. The device program 20 can also be used for connecting with one or more user devices 30. The user device 30 can have a screen, such as a touchscreen device, which can be used to interface with the pictures available through the data transmission device and displayed on the display. The user device 30 can be a proprietary device created to interact with the data transmission device 2.

The device program 20 can have a graphic user interface (GUI) which appears like a web page on the user device or on a second computer (not shown). The user device 30 can interface with either the data transmission device 2, the remote server 26 or both using either a web based interface, the device program 20 or both. Changes made to visual content on the data transmission device 2 which has a corresponding visual content on the remote server 26 can automatically be updated on the remote server based on the end user input to the data transmission device 2. In this way, changes made to content remotely, regardless of the source of the changes, can instantly appear on all interfaces.

The device program 20 can also automate the connection with one or more user devices 30. For example, the device program 20 can provide a web-like log in interface which would allow access to the user device 30 which has a user device program 34. The device program 20 can then configure both the data transmission device 2 and the user device to connect through a wireless device 12. This embodiment is not meant to exclude other means of controlling the configuration of a user device.

The interface program 22 can control the visual content being received from the remote server 26. The interface program 22 can contain visual content parameters which can be used by the remote server 26 or the data transmission device 2 to determine what content is downloaded or uploaded from the remote server or from the data transmission device. Visual content parameters can include, but are not limited to, likes and dislikes regarding both art and non-art related topics, friends or relatives of the user, age of the user, geographic region of the user, relationship status, specific selected artists, specific selected friends and any combination thereof. Further, visual content parameters of friends, relatives or selected individuals by the user, the remote server or a third party can be used to provide visual content to the end user.

Further, the visual content can be altered or presented to the end user based on the visual content parameters. For example, a person from a specific age group and born in a specific time period might be predisposed to like a certain type of art more than another based on statistical analysis. The remote server 26 or the data transmission device 2 can accumulate this information from various sources to provide specific visual manipulations based on those findings. Various sources can include collecting this information from one or more data transmission devices.

The interface program 22 can allow manipulation of the visual content stored on the remote server 26 and on the data transmission device 2. Manipulation can include, but is not limited to, cropping, rendering, blurring, rasterizing, cutting, pasting, making collages, changing a hue or other artistic effects or adjustment. The interface program 22 can create the desired effects based on input from one or more users on at least one of the one or more user devices 30, the remote server 26, the second computer (not shown) or combinations thereof. The resulting visual content can then be displayed on the display 28, the user device 30 or both.

The connectivity program 24 is an optional program which allows the data transmission device 2 to create a secondary network connection. The secondary network connection can be created in the absence of a network connection or it can be created in tandem with a network connection. The connectivity program 24 can use one or more of the wireless devices 12 to create either a Wi-Fi connection or other form of wireless connection to connect to a user device which has a network connection, such as a smart phone. The connectivity program 24 can then access the network 32 through the user device 30 to provide a secondary network connection to the data transmission device 2. The data transmission device 2 can then use the secondary network connection to contact the remote server 26. One or more embodiments can include multiple secondary connections which can be used in tandem.

Figure 3:
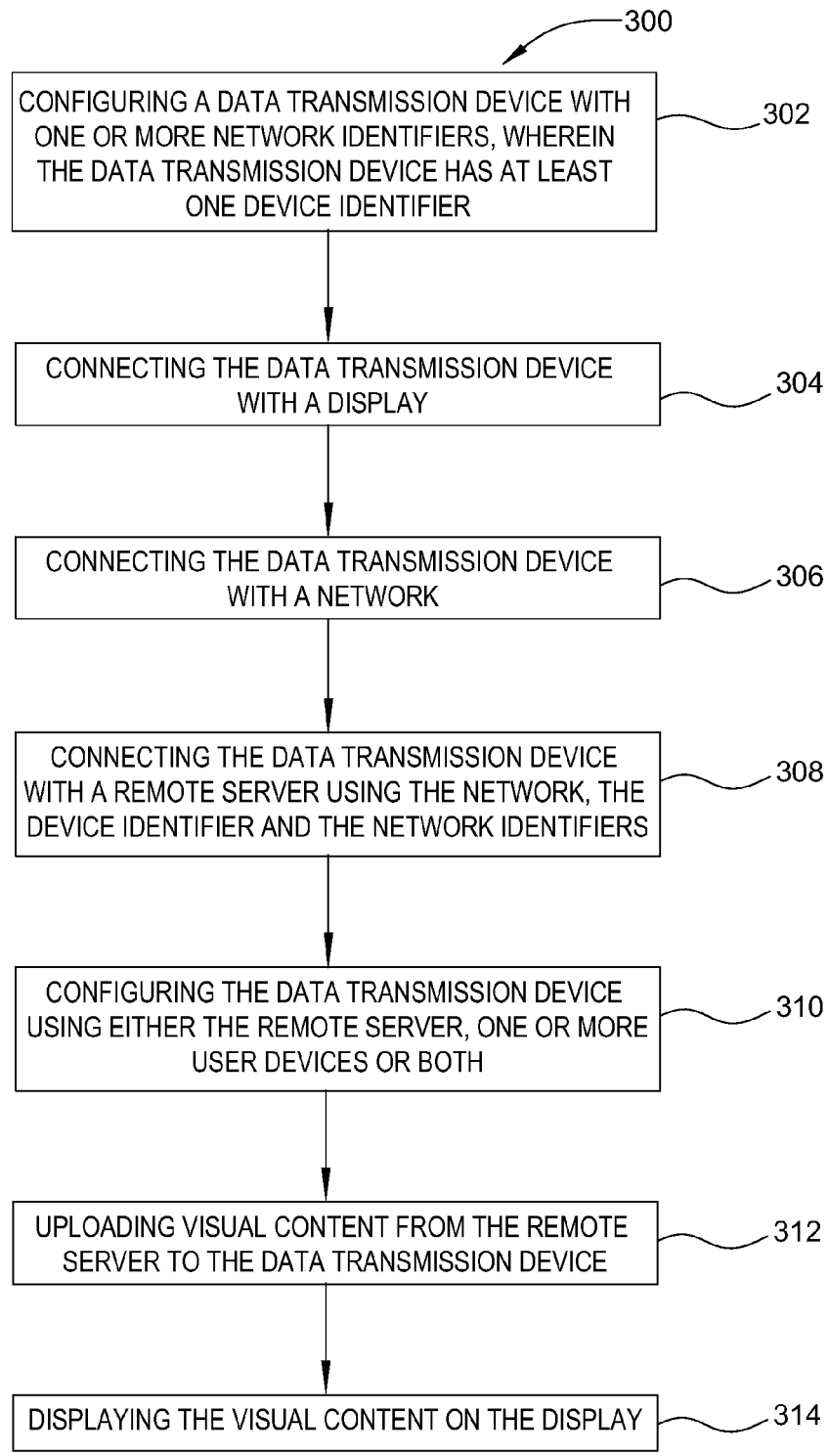
FIG. 3 is a diagram of a method for viewing visual content according to one or more embodiments.

FIG. 3 is a diagram of a method for viewing visual content according to one or more embodiments. The method 300 can include configuring a data transmission device with one or more network identifiers, wherein the data transmission device has at least one device identifier, as in 302. The end user can provide the network identifiers to the remote server either by phone call, in person or by some sort of online medium, such as e-mail or a form on a website. The network identifiers can include, but are not limited to, a user name and password for one or more individual remote server accounts, an identifier for public content that the end user would like to receive, a first and last name, contact information, type of desired visual content, or any combination thereof. This information can then be preprogrammed into the data transmission device prior to receipt by the end user. Embodiments are also envisioned where the device is programmed over a network connection from a remote server or by a technician, who can be operating remotely. Configuring the data transmission device can also include providing settings as to the level of end user interaction which is desired. The data transmission device can be set so as to install, upload/download or generally interact without end user interaction.

The method 300 can further include connecting the data transmission device with a display, as in 304. The data transmission device can come with either a male or female digital video connector, which can be connected with the display. The display can be a high definition display, such as an HDTV or a computer monitor. The device can then provide content which is either preprogrammed onto the data transmission device or downloaded/uploaded content from the remote server.

The method 300 can further include connecting the data transmission device with a network, as in 306. The network can include, but is not limited to, a local area network, an internet connection, a satellite connection, an ad-hoc network, a tethered connection with another network connected device, or any other means of wireless or wired connection between two or more devices or components of a device. The data transmission device can connect with the network based on a prompt from the end user, such as connecting the device to the display, connecting the power source to a power supply or pressing a button on the device. The data transmission device can then search for an available network using preprogrammed data, such as a wireless network identifier and access code/password. If no available network is found, the data transmission device can prompt the user for more information, such as a preferred network and connection information for that network. The data transmission device can connect with a network connected device, such as a user device which is a network connected phone. The data transmission device can then prompt the network connected device for access to either the network or to the device. The data transmission device can then access the network using the network connected device. The data transmission device can also connect to one or more network-connected devices, to one or more networks or to the same network more than once.

The method 300 can further include connecting the data transmission device with a remote server using the network, the device identifier and the network identifier, as in 308. Once the data transmission device is connected with a network, the data transmission device can then contact the remote server using either preprogrammed information, information provided by the end user to the data transmission device or the remote server, or information which is provided by a third party to the data transmission device or the remote server. The connection can be either a permanent connection or a temporary connection. Further, the remote server can then forward the connection with the data transmission device to another remote server or simultaneously connect with another remote server. The content provided to the end user can be controlled by a third party, by the remote server, by a third party server or any combination thereof.

The method 300 can further include configuring the data transmission device using the remote server and one or more user devices, as in 310. The connected remote server can then upload general content to the data transmission device, such as updates to the current software or operating system, updates to the firmware, notices to the user, new software, a new operating system, connection information for the data transmission device, scheduled events, and advertisements. The end user can then be provided prompts on the display when general content is being uploaded, is installed or is available for the end user to view or install. General content can also be displayed, installed or applied without user interaction.

The method 300 can further include uploading visual content from the remote server to the data transmission device, as in 312. The visual content can be derived from a number of sources including generally available content on the web, content owned by individual users, content created by the remote server, content derived from third parties, content owned by the end user or other visual content not previously described. Visual content can include photos, rendered graphics, digital images, slideshows, and composites of any of the above. The visual content can be continually updating or uploading. The continual updating or uploading can provide additional or edited visual content to the end user based on interaction from a third party or based on settings on either the data transmission device or the remote server.

The method 300 can further include displaying the visual content on the display, as in 314. The visual content can be displayed based on a prompt from the user, such as pressing a button on the device; based on display settings or input, such as recognizing when the end user has switched the display to an HDMI setting or when the display is turned on; based on preprogrammed settings; or any combination of the above. Preprogrammed settings can include settings created by the end user, settings created by the remote server, settings created by a third party or combinations thereof. The content can be made available to the end user when the device is no longer connected to the network, the content can be streamed from the remote server or combinations thereof. The device can also process visual content received from the remote server, from a user device, from a second data transmission device or from a third party. The one or more user devices can be used to manipulate the content on the data transmission device or on the remote server which can be displayed on the display. The manipulation can be displayed in real-time on the display, such as a manipulation of visual content on a touchscreen device which is displayed simultaneously between the touchscreen device and the display.

Further embodiments include downloading visual content from a Wi-Fi enabled device, such as a touchscreen device or a Wi-Fi enabled SD card. The downloaded visual content can be uploaded to the remote server based on a network identifier, such as a unique identifier, which can be programmed into the data transmission device. The new content can be uploaded to or downloaded from the remote server by any connected device which has access to the remote server and the proper identifier, as determined by the remote server or a third party. This visual content can then be uploaded and manipulated as described previously. The downloaded visual content can also be stored locally in the memory storage unit without uploading to the remote server, based on preprogrammed settings.

Further embodiments can also include connecting with another data transmission device to exchange content or allow manipulation of the content available to the second data transmission device. The data transmission devices can connect either over the network directly to one another or through the remote server. The data transmission device can also allow one or more user devices to connect to the second data transmission device remotely, wherein the user device can have the same level of control on the second data transmission device as it has on the data transmission device. The connection between the data transmission device and any other person or device can be a secure connection, such as a connection to a user device using an SSL or TLS layer.

The data transmission device and companying method described create a mechanism for remotely configuring and controlling visual content, which can be displayed on a television. The visual content can be controlled at a remote source and uploaded to a data transmission device. The data transmission device can also be controlled by the end user to download content from the remote server. The data transmission device does not require interaction from the end user to produce visual content, which is beneficial for impaired users or for less technically inclined users. The ease of use and transmission allows for any user to have access to the visual content provided to the remote server on any available display.

The data transmission device can be controlled by either the end user or a third party, which creates a means for creating collages, photo albums, cropping pictures and other forms of manipulation using either in interface between the remote server and the data transmission device or the data transmission device alone. The device can be flexible enough to allow for control from multiple sources, thereby allowing the end user to change the visual content received from the remote server or on the remote server, and transmit that content to the data transmission device for viewing on a display.

While the foregoing is directed to embodiments of the present invention, other and further embodiments of the invention may be devised without departing from the basic scope thereof, and the scope thereof is determined by the claims that follow.

The invention claimed is:

1. A data transmission device for viewing visual content comprising:
    a display;
    a digital video connector coupled between the data transmission device and the display; a power supply port; and a computing unit comprising:
    a processor; a memory storage unit; one or more wireless devices, wherein at least one of the wireless devices connects to a network; and
    a computer readable storage medium storing instructions that, when executed by the processor, performs the following operation:
    connecting with a remote server over the network;
    providing one or more network identifiers to the remote server;
    providing one or more queries to the remote server to receive visual content, wherein the visual content comprises one or more of photos, rendered graphics, digital images, slideshows, and composites thereof;
    providing one or more visual content parameters to the remote server;
    providing an interface for connecting with a user device;
    uploading the visual content from the remote server to the computing unit;
    manipulating the visual content on the remote server in response to input received via the interface communicatively coupled with the user device, wherein the manipulating comprises one or more of cropping, rendering, blurring, rasterizing, or an adjustment; and
    displaying the manipulated visual content on the display, wherein the visual content manipulation is displayed in real time simultaneously between the user device and the display.

2. The device of claim 1, further comprising one or more connectivity programs for creating a secondary network.

3. The device of claim 1, wherein the display is a touchscreen display.

4. The device of claim 1, wherein the user device is a touchscreen device.

5. The device of claim 1, wherein the digital video connector is a HDMI port.

6. The device of claim 1, wherein at least one of the one or more wireless devices is a Bluetooth device.

7. The device of claim 1, wherein the power supply port is a USB port.

8. A method for providing visual content to a display comprising:
    configuring a data transmission device with one or more network identifiers, wherein the data transmission device has one or more device identifiers;
    connecting the data transmission device with a remote server using a network, the one or more device identifiers and the one or more network identifiers;
    configuring the data transmission device using the remote server, one or more user devices or both;
    providing one or more visual content parameters to the remote server;
    uploading visual content from the remote server to the data transmission device in response to the visual content parameters, wherein the visual content comprises one or more of photos, rendered graphics, digital images, slideshows, and composites thereof;
    manipulating the visual content on the remote server and the data transmission device in response to input received on the one or more user devices, wherein the manipulating comprises one or more of cropping, rendering, blurring, rasterizing, cutting, pasting, making collages, changing a hue, an artistic effect, or an adjustment; and
    displaying the manipulated visual content on a display connected to the data transmission device, wherein the visual content manipulation is displayed in real time simultaneously between the user device and the display.

9. The method of claim 8, wherein the data transmission device is preconfigured with one or more network identifiers and one or more visual content parameters prior to receipt by an end user.

10. The method of claim 8, wherein the user device is a touchscreen device.

11. The method of claim 8, wherein at least one of the one or more network identifiers is a unique identifier.

12. The method of claim 8, wherein the data transmission device connects with the display using an HDMI port.

13. The method of claim 8, wherein visual content is continuously uploaded from the remote server to the data transmission device.

14. The method of claim 8, wherein the data transmission device is integrated with the display.

15. The method of claim 8, further comprising storing visual content on the data transmission device.

16. The method of claim 8, wherein connecting with a network further comprises: connecting to a user device which has a network connection; and connecting with the network from the user device.

17. The method of claim 8, wherein the remote server selects the visual content based on at least one of the one or more visual content parameters, at least one of the one or more network parameters or combinations thereof.

* * * * *